United States Patent [19]

Nordskog

[11] Patent Number: 4,601,305

[45] Date of Patent: Jul. 22, 1986

[54] COMPACT GAS COMPRESSOR CHECK VALVE

[76] Inventor: Robert A. Nordskog, 18135 Karen Dr., Tarzana, Calif. 91356

[21] Appl. No.: 676,258

[22] Filed: Nov. 29, 1984

[51] Int. Cl.$^4$ ............................................. F16K 15/04
[52] U.S. Cl. ................................ 137/528; 137/533.11
[58] Field of Search ...................... 137/533.11, 533.13, 137/533.15, 519.5, 539, 528

[56] References Cited

U.S. PATENT DOCUMENTS

| | | | |
|---|---|---|---|
| 482,230 | 9/1892 | Crimmel | 137/533.11 X |
| 960,944 | 6/1910 | Johnson | 137/519.5 X |
| 1,476,618 | 12/1923 | Jones | 137/519.5 X |
| 1,714,398 | 5/1929 | O'Bannon | 137/533.11 |
| 3,421,547 | 1/1969 | Aslan | 137/539 |
| 3,583,837 | 6/1971 | Rolsten | 137/533.11 X |
| 3,816,982 | 6/1974 | Regnault | 137/533.11 X |

FOREIGN PATENT DOCUMENTS

| | | | |
|---|---|---|---|
| 512480 | 11/1930 | Fed. Rep. of Germany | 137/533.11 |
| 149464 | 11/1980 | Japan | 137/533.11 |
| 90523 | 10/1937 | Sweden | 137/533.11 |
| 279422 | 11/1951 | Switzerland | 137/533.11 |
| 4191 | of 1909 | United Kingdom | 137/533.11 |

Primary Examiner—Robert G. Nilson
Attorney, Agent, or Firm—John J. Posta, Jr.

[57] ABSTRACT

The check valve is useful in air conditioning compressor units and is designed to take up little space while delivering a maximum flow of air or other gas when in the open position. The valve includes a generally cylindrical valve body with a generally cylindrical central passageway extending lengthwise and which is divided by a sloped annular seat into two portions of different diameters. A ball-shaped valve element is slideably disposed in the larger diameter portion of the passageway, the outer end of which is blocked by a transverse pin. Spaced longitudinally extending protrusions pass radially inwardly from the walls of the larger passageway portion to contact and guide the ball and to define with the passageway walls and ball exterior longitudinal gas flow channels between the ball and passageway walls. These channels are of improved size relative to prior art valves and allowed increased gas flow therethrough for more rapid and efficient air conditioning.

1 Claim, 10 Drawing Figures

COMPACT GAS COMPRESSOR CHECK VALVE

BACKGROUND OF THE INVENTION

1. Field of the Invention

The present invention generally relates to valves and, more particularly, to an improved high flow rate gas compressor check valve.

2. Prior Art

Air conditioning units, such as those for office buildings, homes and the like, frequently are bulky and heavy. However, those designed to be used in aircraft galleys and the like, because of strict weight and space limitations, necessarily have to be very small and relatively light in weight. Unfortunately, such conventional, small galley air conditioning systems have considerable difficulty in dissipating heat rapidly. During those frequent periods when the galleys are being used intensively to warm frozen meals and the like, galley heat can be excessive and can adversely affect crew and passenger comfort.

Current aircraft galley air conditioning compressors employ flap-type one-way check valves which are a large part of the cooling rate problem. Thus, these valves, because of their small size and inherent construction, do not permit a sufficiently high flow rate of freon or other coolant gas therethrough to allow the required rapid galley cooling.

Accordingly, there is a need for an improved aircraft galley air conditioning compressor check valve which is also useful in other compressor applications and which permits, per unit size, a higher freon gas flow rate therethrough for improved efficiency and rapidity of cooling. The valve should be small, light in weight, durable, simple to construct, repair, modify and replace and should be inexpensive. It should also be capable of being made in a variety of sizes, shapes and configurations for special applications.

SUMMARY OF THE INVENTION

The improved check valve of the present invention satisfies all the foregoing needs. The valve is substantially as set forth in the Abstract above. Thus, it includes a preferably generally cylindrical valve body having a central preferably generally cylindrical passageway extending therethrough and divided into large and small diameter portions by a sloped annular seat. A valve element in the form of a bullet or cylinder with conical nose or a ball or the like is slideably disposed in the large diameter portion of the passageway and is held therein against removal therefrom, as by a cross pin or the like.

During use of the valve in a compressor, valve element slides freely between the open gas flow position away from the seat, and the closed gas flow blocking position against the seat. In order to center the valve for sliding ease in the passageway, side protrusions extend into the large diameter portion thereof, and contact the exterior of the valve element or fit into longitudinal recesses therein. The protrusions are directed radially inwardly and extend along substantially the length of the large diameter passageway portion. The side protrusions may be spaced pins inserted through the valve body sides, or may be integral with the valve body. Their free ends may be pointed, squarely rounded or curved and there usually are three or more of the protrusions. In one embodiment of the invention, a pair of protrusions are used, spaced 180° apart and having enlarged curved free ends to receive and retain the curved outer surface of the valve element.

The longitudinal channels defined by the protrusions, valve element outer surface and the side surface defining the passageway itself permit an improved gas flow rate and volume through the valve when the valve element is in the open position. This results in substantially faster more efficient refrigerative cooling by the aircraft galley air conditioning unit or other air conditioner in which the valve is installed. The protrusions serve simultaneously as valve element guides and gas space formers, as noted above.

This simple construction for the improved valve of the present invention eliminates valve failure while increasing gas flow rates therethrough in the open position. The valve is very inexpensive, durable, compact and light in weight. Further features of the invention are set forth in the following detailed description and accompanying drawings.

DRAWINGS

DETAILED DESCRIPTION

FIGS. 1-4

Figure 1:
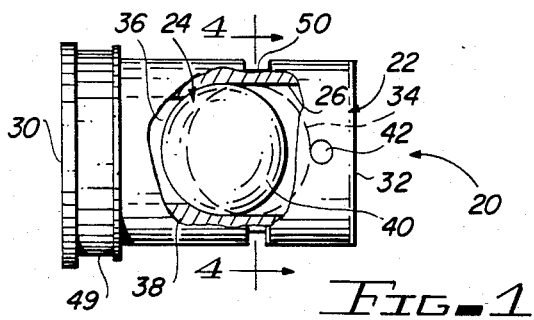
FIG. 1 is a schematic side elevation, partly broken away, of a first preferred embodiment of the improved air conditioning compressor check valve of the present invention.
Figure 2:
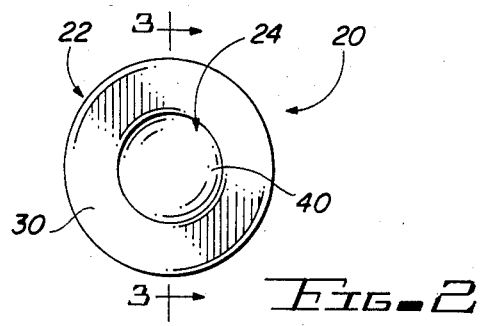
FIG. 2 is a schematic front elevation of the valve of FIG. 1.

Now referring more particularly to FIGS. 1-4 of the accompanying drawings, a first preferred embodiment of the improved air conditioning compressor check valve of the present invention is schematically depicted therein. Thus, valve 20 is shown, which comprises a valve body 22 and a valve element 24 slideably disposed in valve body 22. Valve body 22 is preferably generally cylindrical. Internal surfaces 26 thereof define a preferably generally cylindrical passageway 28 extending longitudinal therethrough at about the longitudinal centerline thereof from end 30 to opposite end 32. Passageway 28 is divided into a portion 34 of greater diameter adjacent end 32 and a portion 36 of lesser diameter adjacent end 30 by a transverse, integral, annular sloped seat 38. If desired, seat 38 could include a gas sealing gasket or the like (not shown). Valve body 22 is preferably metal, although it could be hard chemically resistant rubber or plastic or could be ceramic, cermet, etc.

In the embodiment shown in FIGS. 1-4, valve element 24 is in the form of a sphere or ball 40, preferably of material similar to that of body 22, and dimensioned to slide freely in portion 34 and to totally seal off portion 36 when seated against seat 38, as shown in FIG. 1. Ball 40 is trapped in portion 34 by a permanent or removable transverse pin 42 which extends through the sidewall of body 22 and across at least part of portion 34 adjacent end 32. Retraction of pin 42 would allow ball 40 to be slid out of end 32. The range of movement of ball 40 in body 22 is illustrated in dotted outline in FIG. 3.

Figure 3:
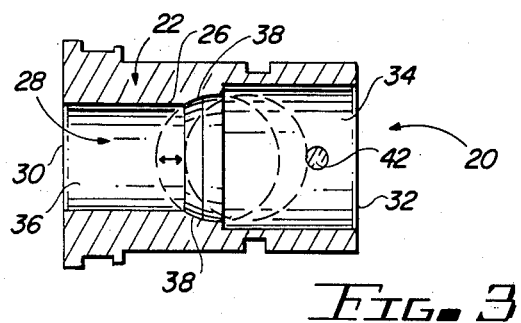
FIG. 3 is a schematic longitudinal section, taken along the section line 3—3 of FIG. 2.
Figure 4:
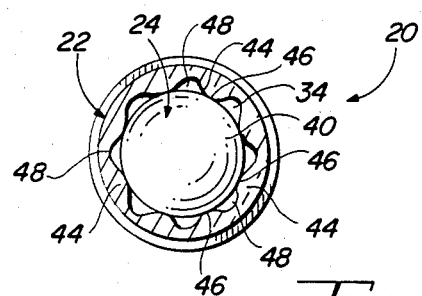
FIG. 4 is a schematic transverse section, taken along the section line 4—4 of FIG. 1, when the ball thereof is in the fully retracted (open) position shown in dotted outline.

In order to center ball 40 in portion 34, portion 34 has a plurality of spaced longitudinally extending protrusions 44 directed radially inwardly from the main portion of internal side surfaces 26, as shown in FIG. 4. Protrusions 44 may be integral with body 22 and have their free ends 46 dimensioned and adapted to center ball 40 in portion 34, while permitting it to freely slide in portion 34. Thus, protrusions 44 act as slide guides for ball 40. Ends 46 thereof may be smooth and are spaced apart diametrically a distance slightly greater than the diameter of ball 40. In FIG. 4, eight protrusions 44 are shown, equally spaced from each other around the perimeter of ball 40. As shown in FIG. 3, protrusions 44 preferably extend the entire length of portion 34 of passageway 28.

Protrusions 44 have the additional and very important function of forming with the adjacent surfaces of portion 34 and ball 24 relatively large gas flow channels 48 extending the length of portion 34. Channels 48 are permanently provided in body 22 free of interference by ball 40. This permits a large and rapid flow of freon and other gases through portion 34, and also through portion 36 when ball 40 is away from seat 38, to enable rapid and efficient refrigerative cooling through efficient operation of a compressor in which valve 20 is installed. Valve body 22 can also include annular external recesses 49 and 50 for retaining O-rings or the like (not shown) as desired. Thus, valve 20 is simple, durable, inexpensive and efficient. It is easy to make and install and can be very small and light weight, as needed for aircraft cooling applications.

FIG. 5

Figure 5:
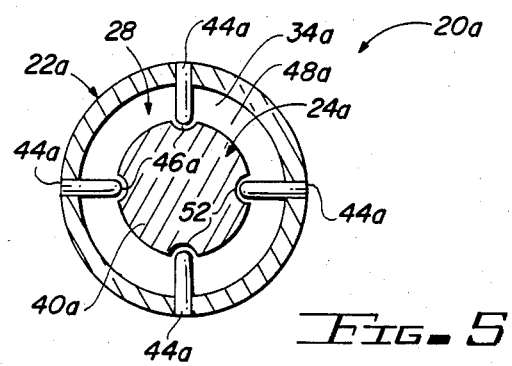
FIG. 5 is a schematic transverse section of a second preferred embodiment of the improved air conditioning compressor check valve of the present invention.

A second preferred embodiment of the improved valve of the present invention is schematically depicted in transverse cross-section in FIG. 5. Thus, valve 20a is shown. Components thereof similar to those of valve 20 bear the same numerals, but are succeeded by the letter "a". Thus, valve 20a includes cylindrical valve body 22 and valve element 24a in the form of a ball 40a centered in portion 34a of passageway 28a by four spaced radial pins 44a extending through body 22a and the rounded free ends 46a of which are received in longitudinal recesses 52 in the outer surface of ball 40a. Valve 20a has its remaining components similar to those of valve 20, is made of similar materials and functions similarly thereto, with the same advantages, except that pins 44a in recesses 52 provide improved directional guidance for ball 40a.

FIG. 6

Figure 6:
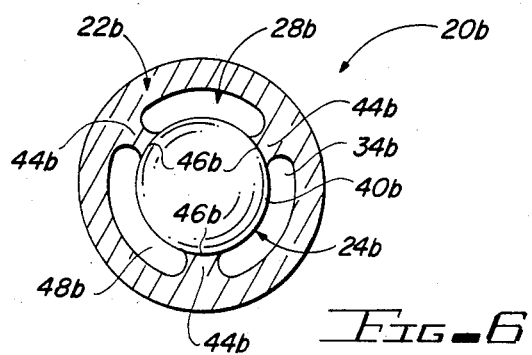
FIG. 6 is a schematic transverse section of a third preferred embodiment of the improved air conditioning compressor check valve of the present invention.

A third preferred embodiment of the improved present valve is schematically depicted in transverse cross-section in FIG. 6. Thus, valve 20b is shown, which differs from valve 20 only in that it has three protrusions 44b spaced 120° apart, which protrusions have curved free ends 46b to match the curvature of ball 40b in body 22b. The properties of valve 20b are similar to valve 20.

FIG. 7

Figure 7:
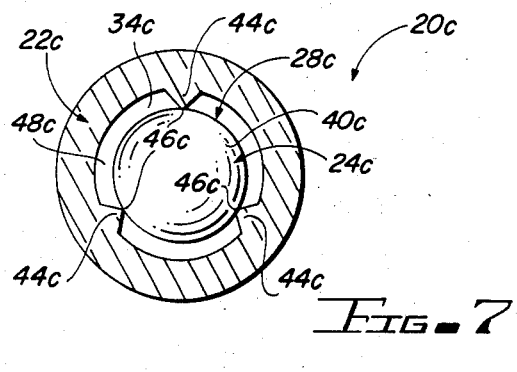
FIG. 7 is a schematic transverse section of a fourth preferred embodiment of the improved air conditioning compressor check valve of the present invention.

A fourth preferred embodiment of improved present valve is schematically depicted in FIG. 7. Valve 20 is shown, identical to valve 20, except that ball 40c thereof is slidably supported in body 22c by three protrusions 34c, spaced 120° apart, the free ends 36c of which are pointed. The properties of valve 20c are similar to those of valve 20.

FIG. 8

Figure 8:
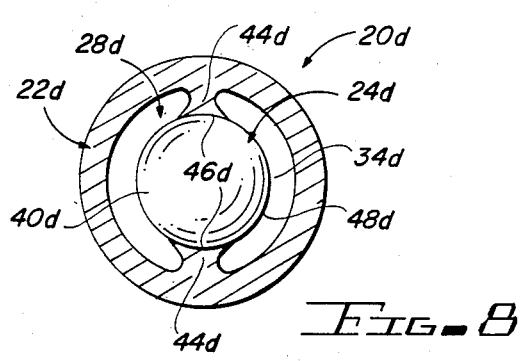
FIG. 8 is a schematic transverse section of a fifth preferred embodiment of the improved air conditioning compressor check valve of the present invention.

A fifth preferred embodiment of the improved valve of the invention is schematically depicted in FIG. 8. Valve 20d is shown which is identical to valve 20 except that ball 40d thereof is supported in body 22d by two protrusions 44d spaced 180° apart, the free ends 46d of which are broad and curved to match the curvature of ball 40d and prevent its dislodgement from the centered position shown in FIG. 8.

In each of valves 20a, 20b, 20c and 20d it will be noted that channels 48a, 48b, 48c and 48d, respectively, thereof are large, considering the size of the respective valves and are completely unobstructed for maximum flow of coolant gas therethrough and the most efficient refrigeration.

Figure 9:
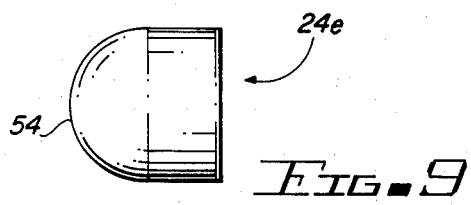
FIG. 9 is a schematic side elevation of a modified form of the sliding valve element portion of the improved air conditioning compressor check valve of the present invention; and, FIG. 10 is a schematic side elevation of another modified form of the sliding valve element portion of the improved air conditioning compressor check valve of the present invention.
Figure 10:
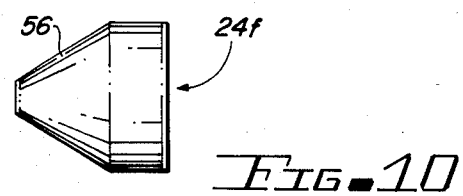

FIGS. 9 and 10

FIGS. 9 and 10 depict alternate embodiments of the slideable valve element utilizable in the valve of the invention. Thus, FIG. 9 depicts in schematic side elevation a bullet-shaped slideable valve element 24e, with its nose alignable against valve seat 38, while FIG. 10 depicts in schematic side elevation a steeple-shaped sliding valve element 24f, with its conical nose 56 alignable against valve seat 38. Elements 24e and 24f can be substituted for ball 40, if desired. The valve of the present invention can be made in any suitable size, for example, 0.9 inch long, 0.62 inch in diameter, and with a ball diameter of 0.38 inch. Various other dimensions are also employed. Thus, the valve can be made larger or smaller.

Various other modifications, changes, alterations and additions can be made in the improved check valve of the present invention, its components and parameters. All such modifications, changes, alterations and additions as are within the scope of the appended claims form part of the present invention.

What is claimed is:
1. An improved compact gas compressor check valve, said valve comprising, in combination:
   (a) a valve body having internal surfaces defining a gas passageway extending longitudinally therethrough from end to end, said passageway having two portions of different diameters separated by a valve element seat,
   (b) a ball valve element having a given constant radius of curvature slideably disposed in the larger diameter portion of said passageway and adapted to block said narrower diameter portion of said passageway when contacting said seat and permitting free flow of gas through said valve when away from said seat;

(c) said valve element seat being curved and having a radius of curvature identical to the radius of curvature of said ball valve element whereby said element and seat form a positive seal of substantial surface area when in contact with one another, (d) retaining means securing said valve element against removal from said larger diameter portion of said passageway;

(e) means defining with said valve element and said internal surfaces spaced gas flow channels extending longitudinally through said larger diameter portion of said passageway for improved gas flow therethrough; and, (f) valve element guide means facilitating centering of said valve element in said passageway and passing therethrough, (g) wherein said valve body is generally cylindrical and said valve seat is annular and integral with said valve body, (h) wherein said means defining gas flow channels comprises a plurality of spaced protrusions directed inwardly from said larger diameter portion of said passageway and adapted to contact the outer surface of said ball, said protrusions extending longitudinally of said passageway, (i) wherein said protrusions act as said valve element guide means and wherein the distance between opposed protrusions is approximately the diameter of the valve element, (j) wherein said protrusions are integral with said internal surfaces defining said larger portion of said passageway, (k) wherein said valve is an aircraft galley air conditioning compressor check valve, wherein said seat is sloped and wherein said retaining means comprises a transverse pin inserted through the side of said valve body and bridging at least a portion of said large diameter portion of said passageway adjacent the outer end thereof, (l) wherein the cross-sectional configuration of said large diameter of said passageway presents a sinusoidal wave form extending about the inside of said passageway, (m) wherein the most inwardly directed portion of said protrusions are rounded and present a single point contact with the outside surface of said valve element.

* * * * *